May 24, 1949.    H. P. CHAPMAN    2,471,259
ELECTRICALLY ACTUATED HEATER
Filed June 7, 1944    2 Sheets-Sheet 2
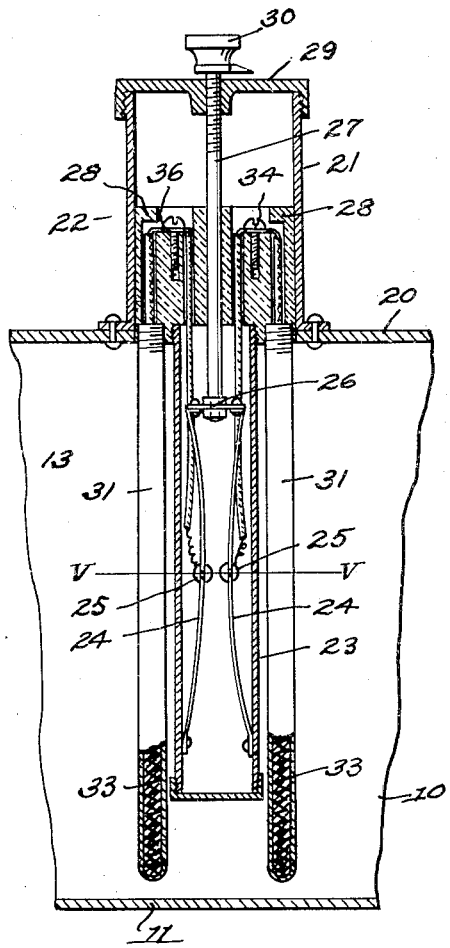
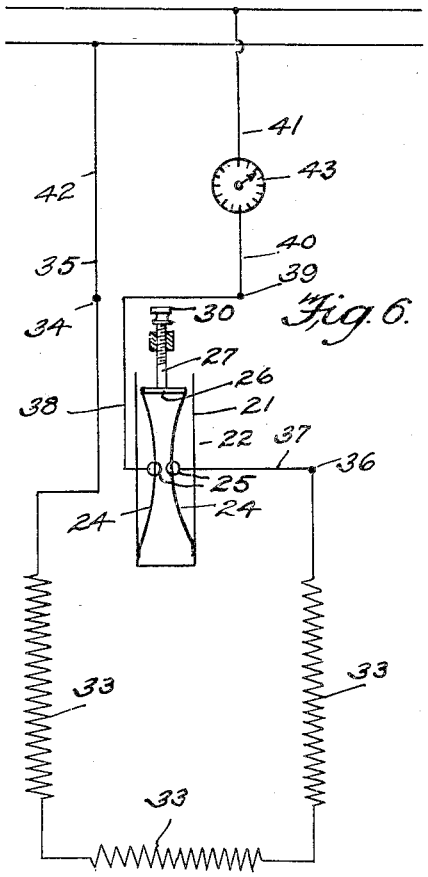
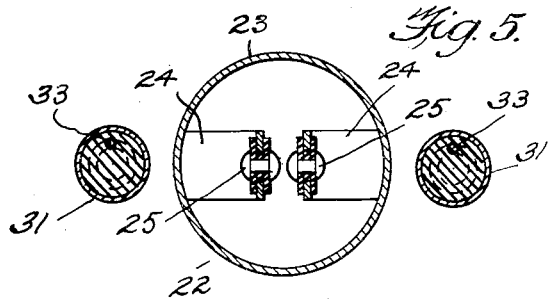
Inventor
Harold P Chapman Patented May 24, 1949

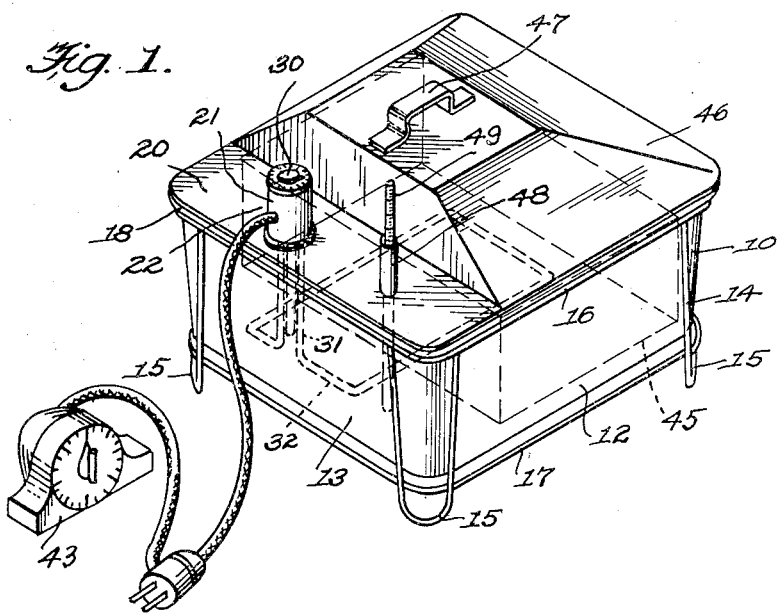
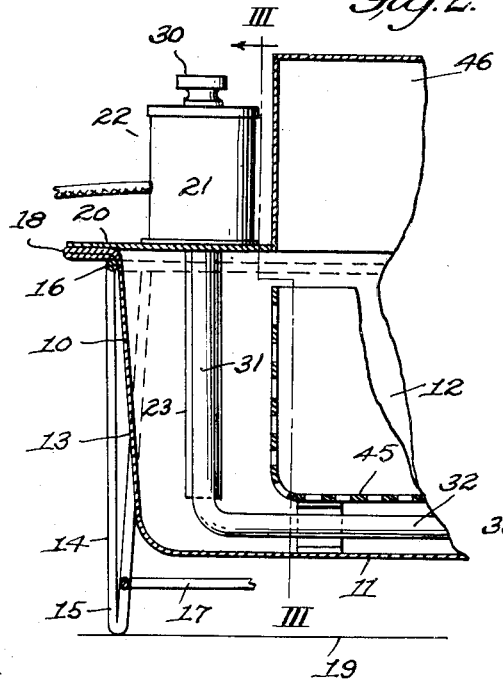
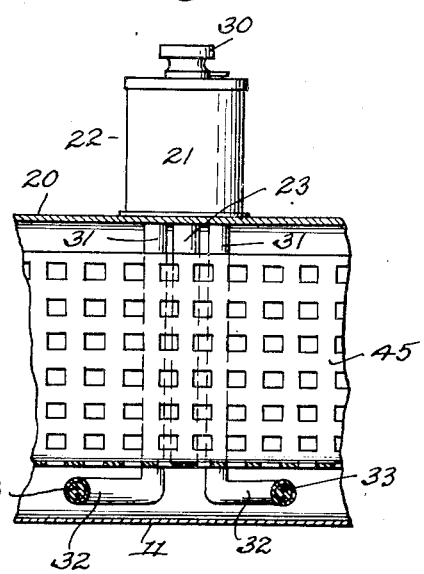

2,471,259

UNITED STATES PATENT OFFICE 2,471,259

ELECTRICALLY ACTUATED HEATER

Harold P. Chapman, Columbus, Ohio, assignor of one-half to Eli F. Mangold, London, Ohio Application June 7, 1944, Serial No. 539,044

6 Claims. (Cl. 219—44)

This invention relates to an improved electrically operated fluid heater, and has for its primary object the provision of an improved heater adapted to be immersed in the fluid to be heated and wherein novel thermostatically controlled means is provided, responsive to the temperature of the fluid undergoing heating, to govern the operation of the heater in order to heat the fluid to selected temperatures.

It is another object of the invention to associate with such a heater a time-controlled switch mechanism by means of which the operation of the heater may be arrested following heating of the fluid to a predetermined temperature and for a selected period of time.

In laboratory apparatus, such as that used by dentists and dental laboratories, it is often desirable to heat impression-forming wax, various plastic materials and other dental materials and appliances to selected temperatures for a given period of time. At present, these ends are largely accomplished by a gas burner placed beneath a water-containing receptacle in which the materials to be heated are placed. Such an operation requires the dentist, or dental assistant, to give the operation close personal supervision, employing hand operated thermometers to ascertain the temperatures of the heating fluid and the materials within the container. As a practical matter, such close personal supervision, for various reasons, is not given and the heating operation is often a matter of guess work and inaccurate control. For example, a dentist is usually busy with patients, is required to answer telephones and other minutiae of office routine and, as a result, his attention is diverted from the heating operation.

Accordingly, the present invention provides apparatus embodying a liquid-holding receptacle having an open top provided with a removable cover, said cover being provided with a unitary coil containing an electrically energized heating resistor, the supply circuit for the resistor leading to a cover-mounted variable temperature thermostat, which may be manually set so that when the temperature of the fluid undergoing heating reaches a predetermined level, current flow through the resistor is discontinued, whereby to arrest further current flow through the resistor, or to periodically energize the same so that the fluid may be held at a desired temperature. Also, the invention contemplates the provision of a time-controlled switch adapted to be detachably connected with the current input leads of the resistor, in order to provide a definite time-controlled limit on the operation of the heater.

It is a further object of the invention to provide a fluid heater of the character indicated in which the electrically controlled and responsive elements of the heater are carried by the removable cover of the receptacle, so that the various parts of the device may be readily separated to facilitate use thereof and provide for their ready cleansing.

For a further understanding of the invention, reference is to be had to the following description and the accompanying drawing, wherein:

Fig. 1 is a perspective view of my improved electrically operated fluid heater;

Fig. 2 is a fragmentary longitudinal and vertical sectional view taken through the apparatus;

Fig. 3 is a vertical transverse sectional view taken on the plane indicated by the line III—III of Fig. 2;

Fig. 4 is a vertical sectional view taken through the thermostatic switch;

Fig. 5 is a horizontal sectional view on the line V—V of Fig. 4;

Fig. 6 is a diagrammatic view of the electrical circuits employed by the apparatus.

Referring more particularly to the drawings, and to a preferred embodiment of my invention specifically disclosed therein, the numeral 10 designates a fluid-holding receptacle which, conveniently, may take the form of a corrosion-resisting pan, having a bottom 11, upstanding side and end walls 12 and 13, respectively, and an open top. The receptacle is supported by means of a wire base frame 14, the latter being formed to embody corner legs 15 with which are welded, soldered or otherwise united rectangular upper and lower rods 16 and 17, respectively. The upper frame-bearing rods 16 engage beneath an outturned flange 18 formed with the upper edges of the receptacle side and end walls 12 and 13, thereby serving to support the receptacle above the base surface indicated at 19.

Positioned upon the upper portion of the receptacle, and constituting part of the top thereof, is a horizontally disposed panel 20. Carried by this panel is the casing 21 of a variable thermostatic switch 22. While this switch may be one of several different forms, a satisfactory embodiment, suitable for the purposes of the present invention, provides a copper or copper alloy tube 23 which depends from the casing 21 and is terminated above the bottom 11 of the receptacle 10 so that a considerable portion of the length of the tube may be immersed in a fluid contained in said receptacle. Internally, the tube is provided with a pair of bowed, oppositely facing, metallic strips 24, the latter being formed from a metal possessing a different coefficient of expansion than the metal comprising the wall of the tube 23. At their nearest adjacent points, the strips are provided intermediately of their lengths with contact elements 25 which, when in relative engagement, are adapted to complete an electrical circuit, hereinafter defined, used in the operation of the apparatus, and when relatively separated to interrupt said circuit.

Thus the lower ends of the strips 24 are securely fastened to the inner wall surface of the tube 23, while the upper ends of said strips are connected with a vertically adjustable head 26, the latter having its axial portion swiveled to the lower end of an adjusting screw 27. This screw extends upwardly through an axial opening provided in a pair of insulator members 28 which are mounted in the casing 21. The upper end of the screw 27 has threaded engagement with the top wall 29 of the casing 21 and projects above said top wall to receive a manipulating knob 30. It will be seen that when the knob 30 is rotated, vertical movement will be imparted to the screw 27 and the head 26. If this movement is downward, the strips 24 are bowed in a direction to bring the contacts 25 toward each other, and, if in an upward direction, such movement will impart torsioning movement to the strips 24 to effect relative separation of the elements 25. In this manner, the operating positions of the strips 24 may be controlled to produce circuit closure at various temperatures.

At each side of the tube 23, the casing 21 on the panel 20 carries the upstanding leg portions 31 of a rectangular heater tube 32, the main body of the latter being disposed in a horizontal plane just above the bottom 11 of the receptacle 10, so that when water or other liquid is placed within the receptacle, the major part of the heater tube will be immersed therein. The heater tube carries an electrical resistor 33. One end of this resistor is connected as at 34 with a current-supplying conductor 35, which leads from a suitable source of current supply, such as a commercial house lighting circuit. The other end of the resistor is connected as at 36 with a lead 37 which extends to one of the contact elements 25. The other of the contact elements is united with a lead 38, the latter being connected as at 39 with a second main conductor 40. The conductors 35 and 40 may be directly united with the conventional source of current supply or, if desired, the same may be detachably united with supplemental conductors 41 and 42 which latter are adapted to be united with the source of current supply. The conductor 41 is connected in series with a variable time-controlled switch mechanism 43 which, when used, provides a variable control over the duration of the heating period of the resistor 33, for instance, periods ranging between five and sixty minutes. At the termination of any such period, the switch mechanism 33 functions to arrest automatically further current flow through the heating resistor of the apparatus.

Within the receptacle, there is provided a removable perforated tray 45 adapted for the support of various articles or materials to be heated, the tray serving to permit of the ready passage of heating fluid through and above the same and at the same time spacing the articles and materials undergoing heating from the heater tube regions 31 and 32, thus protecting such regions from physical injury. The receptacle also carries a detachable cover 46 provided with a manipulating handle 47. Through the use of the panel 20 and the cover 46, the open top of the receptacle may be closed during heating operations. If desired, the panel 20 may be provided with a vertical well 48 adapted for the reception of a removable thermometer 49, whereby the temperature of the fluid undergoing heating may be visually noted from time to time whenever desired.

In view of the foregoing, it will be seen that the present invention provides an electrically operated fluid heater in which various materials may be heated to desired temperatures with accurate control over the temperatures attained. Also, with the use of the time-controlled switch mechanism, the duration of such heating periods is subject to accurate control. The apparatus is thus constructed to provide four principal parts; first, the pan or receptacle 10; second, the unit consisting of the base frame 14, the panel 20 and the switch and heating mechanisms 22, 31 and 32; third, the removable cover; and, fourth, the shielding tray for receiving the commodities to be heated and protecting the heating coil against injury. These parts are relatively separable as individual units, so that the apparatus may be kept in a clean, sanitary condition.

While I have described the use of my device as a readily controlled heater for use by dentists in dental laboratories, it will be understood that this is but one of many uses to which the present invention is applicable and therefore I reserve the right to employ my improved apparatus in any capacity in which the same may be found useful, and to make all such variations in the construction thereof that may fall within the scope of the following claims.

I claim:

1. An electrically actuated heater comprising a pan, an adjustable thermostatic switch mechanism carried by said pan, said mechanism including a depending heat-sensitive tube arranged vertically within and adjacent to one side of said pan for immersion in liquid contained therein, a heating element embodying an electrically energized horizontally disposed heating coil arranged in said pan immediately adjacent to and parallel with the bottom thereof, said coil terminating in upstanding parallel leg portions joined with said thermostatic switch mechanism, a foraminated tray removably mounted in said pan, said tray having a horizontal portion arranged over said coil and an upstanding vertical portion arranged in spaced relation to said heat-sensitive tube and the upstanding leg portions of said heating element, and a removable cover for the top of said pan, said heat-sensitive tube containing a switch therein and functioning as an element of a bimetallic thermostat actuating said switch.

2. A removable unitary electrical heater for open-topped liquid-receiving receptacles, comprising a resistor-containing coil, the latter being formed to embody a lower portion adapted to occupy a substantially horizontal plane above the bottom of an associated receptacle, said lower portion terminating at one end in a pair of spaced parallel upstanding leg members adapted to be positioned contiguous to a vertical side wall of such associated receptacle, a thermostatic switch casing joined with the upper ends of said leg members, said switch casing being formed to include a depending tube adapted to be immersed in the liquid contained in the receptacle and disposed between said leg members in immediately adjacent heat-conducting relationship therewith, a temperature-responsive switch positioned in said tube and connected electrically with the resistors of said coil, and manually adjustable means accessible exteriorly of said casing for varying the temperature-response of said switch, said tube being one of the metallic elements forming a bimetallic thermostat actuating said switch.

3. A removable unitary electrical heater for open-topped liquid-receiving receptacles, comprising a resistor-containing coil, the latter having a lower portion disposed in a substantially horizontal plane, said lower portion terminating in a pair of spaced parallel upstanding leg members, a thermostatic switch casing having a depending tube adapted to be immersed in liquid contained in an associated receptacle and arranged between said leg members in immediately adjacent heat-conducting relationship therewith, an adjustable thermostatic switch mounted in said tube, means unitarily joining said leg members with said thermostatic switch casing, and manually adjustable means accessible exteriorly of said casing for varying the temperature-responsive action of said thermostatic switch, the thermostatic switch casing forming a thermostat element of the switch mounted in the tube.

4. A unitary electrical heater adapted to be removably positioned in open-topped liquid-receiving receptacles, comprising a casing adapted to be removably positioned on the top of an associated receptacle and to extend into the latter adjacent to one side thereof for immersion in liquid contained in the receptacle, a resistor-containing coil carried by said casing, said coil having vertical portions disposed on opposite sides of the portion of said casing depending into said receptacle and in heat-exchanging relationship with the walls of said casing, means carried by said casing for removably supporting the same and said coil from the upper edge portions of the associated receptacle, a thermostatic switch arranged in the depending portions of said casing, conductors uniting said switch with the resistors of said coil, and manually operated means accessible exteriorly of said casing from the top thereof for controlling the temperature-responsive action of said switch, the casing housing the switch forming a thermostatic element thereof.

5. A unitary electrical heater adapted to be removably positioned in open-topped liquid-containing receptacles, comprising a vertically disposed liquid-excluding casing, means carried by said casing for removably supporting the latter on the upper edge portion of an associated receptacle with the lower portion of the casing extending into said receptacle for immersion in liquid contained therein and terminating above the bottom of the receptacle, a resistor-containing coil, said coil being carried by said casing and being formed to include spaced vertically extending portions arranged at the side of the casing in heat exchanging relationship with the walls of the latter, the lower portion of said coil terminating in a substantially horizontal plane and projecting laterally from the bottom of the casing above the bottom of the associated receptacle, a thermostatic switch positioned in the depending portion of said casing, said switch being formed to include a pair of oppositely bowed flexing elements, means connecting the lower ends of said elements in fixed relation to the walls of said casing, conductor contacts carried by said elements in the middle region thereof, conductors uniting said contacts with the resistors of said coil, and manually adjustable means accessible from the upper exterior part of said casing for flexing said elements and thereby regulating the spacing of said contacts.

6. In combination with a receptacle adapted to contain a fluid to be heated to and maintained at a constant temperature, a removable unitary thermostatically controlled electrical heater which comprises a support carrying a metallic casing sealed from liquid and defining one element of a bimetallic thermostat, a second element of the thermostat having a different coefficient of expansion than said casing enclosed therein and attached thereto in thermostatic operative relation, switch means within said casing on said second element to make or break an electrical circuit, a resistor heating coil connected in said electrical circuit and carried by said support adjacent to said metallic casing in immediate heat exchange relationship thereto, manually adjustable means attached to said second element and accessible exteriorly of said receptacle for varying the temperature-response of said switch, the metallic casing and the resistor heating coil extending into said receptacle in substantial contact with fluid contained therein.

HAROLD P. CHAPMAN.

REFERENCES CITED

The following references are of record in the file of this patent:

UNITED STATES PATENTS

| Number | Name | Date |
|---|---|---|
| 541,724 | Custer | June 25, 1895 |
| 547,714 | Custer | Oct. 8, 1895 |
| 1,619,146 | Martin | Mar. 1, 1927 |
| 1,673,140 | Dechmann | June 12, 1928 |
| 1,690,898 | Hart | Nov. 6, 1928 |
| 1,714,578 | Weiss | May 28, 1929 |
| 1,930,551 | Blashfield | Oct. 17, 1933 |
| 1,994,909 | Ehrgott | Mar. 19, 1935 |
| 2,044,573 | Hornberger | June 16, 1936 |
| 2,134,675 | Shroyer | Oct. 25, 1938 |
| 2,350,941 | Stevenson | June 6, 1944 |

FOREIGN PATENTS

| Number | Country | Date |
|---|---|---|
| 566,639 | France | May 24, 1923 |